United States Patent [19]

Schweiger et al.

[11] 3,971,444
[45] July 27, 1976

[54] REACTION VESSELS CHARGED WITH SPHERICAL ELEMENTS

[75] Inventors: Fritz Schweiger, Hagen; Jürgen Wohler, Uentrop, both of Germany

[73] Assignee: Hochtemperatur-Kernkraftwerk Gesellschaft mit beschrankter Haftung (HKG), Gemeinsames Europaisches, Uentrop, Germany

[22] Filed: July 22, 1974

[21] Appl. No.: 490,692

Related U.S. Application Data

[63] Continuation-in-part of Ser. No. 273,168, July 19, 1972.

[30] Foreign Application Priority Data

July 21, 1971 Germany............................ 2136403

[52] U.S. Cl.............................. 176/32; 176/36 R; 176/58 PB
[51] Int. Cl.².......................................... G21C 19/00
[58] Field of Search ................. 176/36 R, 91 SP, 45, 176/39, 30–32, 50, 58 PB

[56] References Cited
UNITED STATES PATENTS

| | | | |
|---|---|---|---|
| 3,208,912 | 9/1965 | Jaye et al............................. | 176/30 |
| 3,325,373 | 6/1967 | Schlicht et al........................ | 176/39 |
| 3,398,051 | 8/1968 | Seltorp................................. | 176/45 |
| 3,519,536 | 7/1970 | Rausch................................. | 176/36 |

*Primary Examiner*—Harvey E. Behrend
*Attorney, Agent, or Firm*—Toren, McGeady and Stanger

[57] ABSTRACT

A reaction vessel which holds a charge of spherical reaction elements, for example a pebble bed nuclear reactor having a charge of spherical fuel elements, has the charge formed of at least two groups of spherical elements with all of the elements in each group being of equal diameter, but each group of elements having a different diameter from the other. The elements of both groups are uniformly mixed together and the different diameters are chosen in such a way that when the elements are continuously circulated through the reaction vessel during operation, the circulation does not cause the two groups of elements to segregate during the intended number of circulation cycles. Further, when control rods are used in a nuclear reactor which are advanced into and retracted from direct contact with the spherical elements for providing control and shutdown of the nuclear reaction, the use of spherical elements selected from at least two groups, each of which has a different diameter and where the difference in diameters is in a selected range so that the random arrangement of elements is maintained during continuous circulation of the core, prevents the elements from becoming tightly packed together so that insertion of the control rods into the core is facilitated.

4 Claims, 4 Drawing Figures

U.S. Patent    July 27, 1976    3,971,444
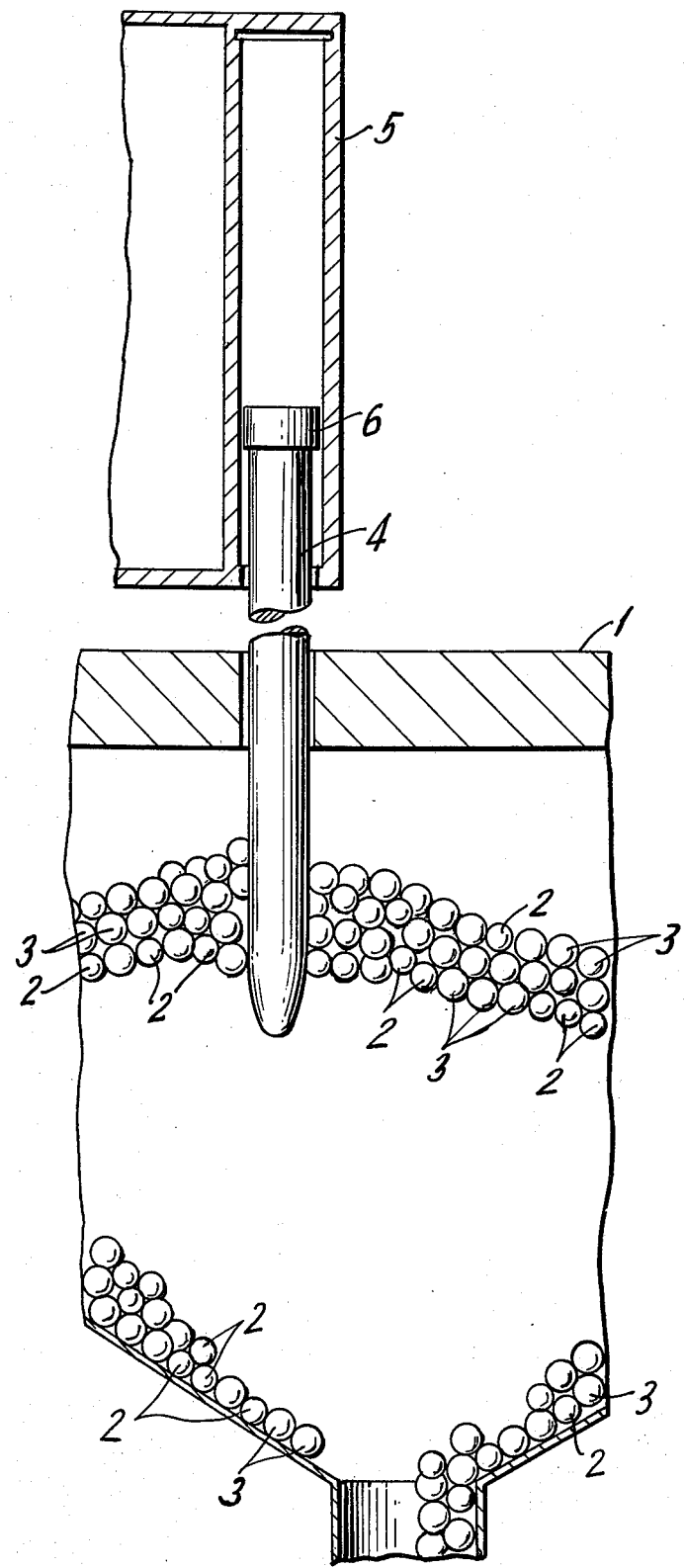

REACTION VESSELS CHARGED WITH SPHERICAL ELEMENTS

This application is a continuation-in-part of Ser. No. 273,168 filed on July 19, 1972.

SUMMARY OF THE INVENTION

The present invention is directed to reaction vessels of the kind having a charge of spherical reaction elements, for example fuel elements forming a core of a pebble bed nuclear reactor in which control and/or shutdown rods are provided for insertion into and retraction from the charge to control the reaction with the rods being in direct contact with the elements. Further, during operation of the reaction vessel, the charge is continuously circulated.

In the operation of reaction vessels of this type, especially pebble bed nuclear reactors, it is necessary to advance and retract the control rods quite frequently, that is, to vary their depth of penetration into the charge in direct contact with the elements. Such movements of the control rods involve a number of difficulties in reactors containing a bulk charge of spherical reaction elements as will be described.

During the operation of the reaction vessel, the spherical elements are moved about by a variety of influences, that is, not only by the circulation of the elements through the vessel, but also by the movement of the control rod, while the heat movements in the charge, as well as the pressure drop of the coolant gas additionally affect the stresses within the charge of elements. Due to the movement of the elements, they tend to adopt an arrangement corresponding to the maximum possible density of the charge, that is, the most tightly packed arangement of the elements. This makes it different to manipulate and control the charge because the elements become too tightly packed together to allow necessary movements of the control rods to take place. Where the elements are all of the same diameter, they adopt an ordered pattern or arrangement corresponding to the maximum bulk density in which each spherical element is in contact with the twelve neighboring spherical elements. In practice, this means that the most dense packing of the elements corresponds to the most rigid charge which is a highly undesirable condition. With the elements in the most rigid arrangement, moving the control rods into the charge can result in damage to either or both rods and the elements.

To obtain an almost homogenous distribution of the more or less burnt up fuel elements in the pebble bed and thereby a well-controlled nuclear reaction in a pebble-bed reactor, the spherical elements must circulate through the core in a desired manner, each individual element traveling through the core at a desired velocity. If the elements become too densely packed together it will interfere with the relative velocities of travel of the elements near the outer surface of the core and also in the central region, particularly if there is only one central tube through which the elements are removed from the reaction vessel. Attempts have been made to counteract this undesirable influence on the flow of the charge by milling interference structure into the lateral surface of the reflector enclosing the core, the intention being to prevent the outer layers of the core from becoming too densely packed. However, these interference structures influence only the outer part of the charge. The difficulty remains that when the control and shutdown rods are advanced into the charge very high stresses are applied to the elements by the tips or leading ends of the advancing rods. If the charge is too densely packed the stresses become excessive, particularly with deep penetration of the rods, possibly fracturing the elements and even damaging the rods.

It has not been possible, for constructional as well as operational reasons, to install structural parts in the reactor to prevent the charge from becoming too densely packed in the interior of the core. The only remedy available today has been to avoid direct contact of the control rods with the elements forming the core by installing stationary guide tubes which extend permanently through the core, with the control rods being advanced and retracted within the guide tubes. However, among other reasons, this remedy is not only costly, but by adding other structural members into the core, interferes with the circulation of the elements in an undesirable manner.

The primary object of the present invention is to ensure that a charge of spherical reactions elements in a reaction vessel, for example a charge of spherical fuel elements forming the core of a pebble bed reactor, does not become too densely packed, and especially to ensure that the arrangement of the spherical elements does not approach the maximum density, even under the most unfavorable circumstances, without this involving the use of additional structures in the reaction vessel.

In accordance with the present invention, a charge of spherical reaction elements are circulated through the core of the nuclear reactor during operation and the charge contains at least two groups of spherical elements uniformly mixed together. All of the elements in each group are of the same diameter but each group of elements has a different diameter from the other. The difference in diameter between the groups is selected in a range of 5 to 35%, and preferably 5 to 20%, to afford the desired relation between the different sized elements. Further, with the elements uniformly mixed together within the selected range of diameters, the continuous circulation of the elements through the core does not cause their substantial segregation into separate groups.

The provision of the groups of elements of different diameter within a selected range prevents the elements from adopting an arrangement which corresponds to the most dense possible packing, in which each sphere is in contact with twelve neighboring spheres, and accordingly, when the control rods are advanced into the charge it is possible for the elements to be displaced relative to one another and the stresses applied to the elements and to the tips of the rods are considerably reduced. Therefore, it is not necessary to use special means for the up th charge, for example introducing additional structures into the space containing the spherical elements which would interfere with the circulation of the elements and the optimum operation of the reaction.

While previously the use of interferences structures were considered necessary to avoid dense packing of the core members, it has been appreciated that such structures disturb the movement of the core members and result in additional production costs. Further, it has been discovered that the use of different diameter sized balls affords the result intended by the utilization of interference structures without the disadvantages of such structures. The use of different diameter sized balls provides a surprising effect, since normally it would be expected that such different sized members would result in a tighter packing of the core.

However, merely using different sizes of the balls is not sufficient because with improper size selection a tightly packed segregated arrangement would occur. It is known from concrete technology that in a mixture of coarse and fne aggregate, the fine aggregate tends to fill the interstices between the coarse aggregate and, as a result, there is a segregation of the different sizes of aggregate. Further, in such an arrangement of the aggregate a densification of the mixture takes place. Accordingly, persons familiar with such technology would not expect the result obtained by the present invention. This is particularly true where it is considered that the balls are continuously circulated through the core which would tend to cause segregation and packing and the repeated insertion of rods into the core would also cause packing.

It is sufficient to use elements of only two different diameters as long as they are selected of sizes which provide the desired effect. If the diameters of the elements are too close in size it will be not possible to avoid dense packing of the core. If the diameters are too far apart difficulties will develop in conveying the different diameters, and segregation may occur or the proper spacing with the ability to absorb the stresses developed during the insertion of the control rods will not result. Tests have been made which indicate the effectiveness of the use of two different sizes of reaction elements as compared with a core made up all of one diameter size of elements. Additional factors to be considered in selecting the element diameters include the reactor core size, the recirculation apparatus to be used with the reactor, and the characteristics of the elements under irradiation, for example, the degree of expansion they undergo and their elasticity. The range of elements to be effective is between 5 and 35%. with the preferred range being between 5 and 20%. As an example, if a reactor core is designed to operate with a standard size element of 60 mm, then one group of elements would have the size of 60 mm and the other group, based on the preferred size range, would be between 48 mm and 57 mm, if smaller, and between 63 mm and 72 mm, if larger.

With such an arrangement of the elements, it is impossible for any element to rest in contact with twelve neighboring spheres. The smaller spherical elements necessarily produce extra empty spaces and the resulting arrangement makes it easier for the elements to move out of the way of the control rods when the rods are advanced into the charge.

After establishing a standard element diameter for use in a particular reactor, the selection of the diametral size of the elements is based first on obtaining, to the highest degree possible, the effect intended by the invention, which is to prevent the elements from becoming too densely packed together, and secondly to prevent any serious segregation of the elements of different diameters during the circulation of the charge.

With conventional charges, experiments have shown that, during advancement of the control rods into the charge, mechanical stresses applied to the individual elements by the rod tips vary in such a way that, particularly at greater depths of penetration, thrusts supplied radially to the elements by the rod tips almost reach the ultimate compressive strengths of the elements. By means of the invention, the occurrence of these very high stresses is prevented, the highest stresses developed between the rod tips and the elements being reduced sufficiently to ensure that they cannot reach values high enough to fracture the elements by excessive stresses applied in compression or to damage the control rods. Therefore, the invention is applicable to all reaction vessels with bulk charges, such as pebble bed nuclear reactors, which employ spherical elements and which are required to circulate in a controlled way and may also be required to withstand the penetration of bodies the dimension and shapes of which are different from those of the elements.

The invention can be applied with advantage to all reaction vessels containing a bulk charge of spherical elements which are being circulated during the operation of the reaction vessel.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The drawing is a partial vertical view of a reaction vessel containing a charge of spherical reaction elements in accordance with the present invention.

DETAILED DESCRIPTION OF THE INVENTION

In the drawing a reaction vessel, such as a nuclear reactor, is shown containing a charge or core made up of two groups of spherical elements 2, 3 arranged in uniform mixture. In each of the groups, the spherical elements have the same diameter, however, the spherical elements 2 in one group have a different diameter from the spherical elements 3 in the other group. Means, not shown, are arranged to circulate the uniformly mixed charge of spherical elements 2, 3 during the operation of the reaction vessel. The elements are introduced in through the top of the reaction vessel 1, passed downwardly through the vessel, and are removed through the discharge pipe located at the lower end of the vessel.

Control rods 4, only one control rod is shown in the drawing, are positioned within the reaction vessel extending into the body of the uniformly mixed fuel elements for regulating the reaction. From the reaction vessel 1, each of the control rods extend upwardly into a cylinder 5. Each cylinder has a double-acting piston 6 at its upper end within the cylinder. By selectively supplying hydraulic or pneumatic fluid or pressurized gas (helium) into the cylinder, the control rods can be moved upwardly and downwardly, as required, within the reaction vessel 1. The diameter of the elements in each group is selected in such a way that the circulation of the elements 2, 3 within the reaction vessel does not cause any substantial segregation of the elements into separate groups. If, considering the reaction vessel, its parameters and the conditions to be experienced during operation, a standard size element could be selected as 60mm. With such a standard element forming the diameter for one of the groups, the diameter for the other group could be selected in the range of 5 to 35% smaller or greater than 60 mm and preferably in the range of 5 to 20% smaller or greater.

The arrangement of least two groups of fuel elements could be used in a reactor such as the type presently under construction in Germany known as the THTR (thorium high temperature reactor). The THTR is a 300 MWe nuclear power plant and uses helium as a coolant gas in the primary circuit for transferring the heat removed from the fission reaction to the steam generators in the secondary circuit. The reactor core is located within a prestressed concrete pressure vessel and has a diameter of 5.6m and a height of 6m. The core is made up of 675,000 fuel element spheres providing a pebble bed volume of 125m³. Each fuel element is 60mm in diameter, that is, about the size of a tennis ball, with an outer fuel-free graphite shell having a wall thickness of 5mm. Within the shell, the fuel is contained in the form of 35,000 small coated particles of 0.3 to 0.4mm diameter coated with pyro-graphite embedded in a graphite matrix. The heavy metal contents of each fuel element is 0.96g U235 (93% enriched) and 9.62g Th 232.

The core is enclosed within a graphite reflector with fuel element loading pipes passing through the upper end of the reflector for adding fuel element spheres to the core and with a centrally arranged fuel element discharge pipe located in the bottom of the reflector.

To control and shut down reactor operation, 42 absorber or shutdown rods are arranged for insertion into the core in direct contact with the fuel elements with 36 control rods located laterally of the core in boreholes formed in the reflector. The incore rods are preferably designed for normal shut-down of the reactor as well as for scram in the case of fault conditions. The reflector rods are primarily used for temperature and partial load control.

Continuous fueling of the core is practiced to ensure uniform and high burn-up of the fuel elements, the fuel elements move slowly downwardly through the core with the fuel elements in the central regions moving faster than those in the outer annular regions between the central region and the reflector. On the average a fuel element resides within the core a period of 36 months and usually is passed through the core five to seven times, preferably six times. As fuel elements are removed from the bottom of the core, they pass through the discharge pipe into a singulizer and are then led to a damaged sphere separator where fuel elements whose shape and dimensions have significantly changed are eliminated from the recirculation cycle. The other fuel elements, after having passed a buffer line, are led into a distinguishing and burn-up measurement device. According to sphere burn-up, and depending on the fueling program, a computer decides whether the element is discharged from the circulating cycle or recycled back into the core at its top.

Continuous circulation means that during operation a certain number of elements per day at full power are added to the top of the core and a similar number are removed from the bottom. It is possible that a period of time may pass between each charging and discharging step, even up to several days in time, however, such circulation is still considered continuous. By comparison, it is known to leave fuel elements within a core for an extended period of time and then during a period of shutdown to replace at least a portion of the elements. However, such operation is not a continuous circulation of the elements moving downwardly through the core during reactor operation.

The helium gas coolant is forced downwardly through the reactor core, removing heat from the fuel elements and exiting through boreholes in the bottom reflector.

If, instead of a single size fuel element, the present invention is employed and two groups of differently sized elements are utilized, it would be preferable to take the 60mm diameter of the THTR fuel elements as a standard. To assure a random rather than ordered orientation of the fuel elements within the core, as might develop when a single size element is used, at least one additional group of fuel elements is selected for use along with a group of the 60mm elements. The additional group would be in the range of 5 to 35%, and preferably in the range of 5 to 20%, greater or less than the standard 60mm diameter. In other words, the diameter of one group would be 60mm while the diameter of the other group would be selected from the range of 48 to 57mm or 63 to 72mm, depending on whether, in accordance with the various conditions involved, it is decided to employ a fuel element size smaller or larger than the standard size.

To determine the difference in pressure acting on control rod fuel elements when one size fuel element is employed in the core as compared with two groups of fuel elements each of a different diametral size, testing has indicated that a very significant reduction in fuel element stress is obtained where two different sized diameter spherical elements are used and are uniformly mixed together.

It had been thought that the use of two different size elements would result in segregation due to continuous recycling, however, by employing the two different diametral sized groups, it is possible to maintain a random and non-segregated arrangement which assures continuous recirculating operation with adequate control without adverse stress effects on the fuel elements and the control rods.

While a specific embodiment of the invention has been shown and described in detail to illustrate the application of the inventive principles, it will be understood that the invention may be embodied otherwise without departing from such principles.

What is claimed is:

1. In a nuclear reactor, a reaction vessel, a charge of spherical reaction elements positioned in said vessel, means for providing a continuous circulation of said reaction elements through said vessel during operation thereof, a plurality of control rods and means for advancing said control rods into said charge during operation in direct contact with said elements and for retracting said control rods from said charge, wherein the improvement comprises that said charge consists of two groups of said spherical elements, all of the elements in each of said groups being of the same diameter and the elements in each one of said groups being a different diameter from the elements in the other one of said groups, all of said elements being uniformly mixed together in said vessel and the different diameters of said groups being selected so that the diameter of one said group differs from the diameter of the other said group within a range of from 5 to 35% of the diameter of the other said group and the arrangement of the spherical elements is such that during the circulation of said spherical elements through said vessel during vessel operation the substantial segregation of said elements into said groups does not take place and the selected range in diameters prevents the charge of spherical elements from packing tightly together so that the advancement of said control rods into the charge in direct contact with the spherical elements is facilitated without causing damaging stresses to said spherical elements or to said control rods.

2. In a nuclear reactor, as set forth in claim 1, wherein the difference in diameter of the one said group from the diameter of the other said group is within the range of 5 to 20% of the diameter of the other said group.

3. In a nuclear reactor, as set forth in claim 2, wherein in the charge consisting of two groups of said elements, the diameter of one of said groups is 60mm and the diameter of the other said group is in the range of 48 to 57mm.

4. In a nuclear reactor, as set forth in claim 2, wherein in the charge consisting of two groups of said elements, the diameter of one of said groups is 60mm and the diameter of the other group is in the range of 63 to 72mm.

* * * * *

UNITED STATES PATENT OFFICE
CERTIFICATE OF CORRECTION

Patent No. 3,971,444           Dated July 27, 1976

Inventor(s) Fritz Schweiger et al

It is certified that error appears in the above-identified patent and that said Letters Patent are hereby corrected as shown below:

In the heading of the Patent [73] should read as follows:

-- [73] Hochtemperatur-Kernkraftwerk GmbH (HKG)

Gemeinsames Europäisches Unternehmen,

Uentrop, Germany --.

Signed and Sealed this

Eighth Day of March 1977

[SEAL]

*Attest:*

RUTH C. MASON
*Attesting Officer*

C. MARSHALL DANN
*Commissioner of Patents and Trademarks*